United States Patent [19]
Kulker

[11] Patent Number: 5,370,413
[45] Date of Patent: Dec. 6, 1994

[54] VEHICLE TOWING APPARATUS

[76] Inventor: Leo Kulker, 316 Wheelihan Way, P.O. Box 72, Campbellville, Ontario, Canada, L0P 1B0

[21] Appl. No.: 134,435

[22] Filed: Oct. 12, 1993

[51] Int. Cl.$^5$ ............................................. B60P 3/075
[52] U.S. Cl. ..................................... 280/402; 280/503
[58] Field of Search .................. 280/402, 491.1, 495, 280/503, 767; 301/128

[56] References Cited

U.S. PATENT DOCUMENTS

| | | | |
|---|---|---|---|
| 2,541,582 | 2/1951 | Hawkins | 280/33.5 |
| 3,417,890 | 12/1968 | Yamazaki | 214/506 |
| 3,559,827 | 2/1971 | Schier | 214/86 |
| 3,583,728 | 6/1971 | Cornell et al. | 280/503 |
| 3,717,364 | 2/1973 | McClive | 280/503 |
| 3,814,464 | 6/1974 | Wardill et al. | 280/503 |
| 4,147,373 | 4/1979 | Cully | 280/445 |
| 4,483,549 | 11/1984 | Nikawa | 280/402 |
| 4,691,934 | 9/1987 | Tomse | 280/503 |
| 5,112,075 | 5/1992 | Tomse | 280/503 |

FOREIGN PATENT DOCUMENTS 783078 11/1980 U.S.S.R. .................. 280/402

OTHER PUBLICATIONS

Brochure Remco The Towing Experts for Recreational Equipment Manufacturing Corporation of Omaha, Neb.

*Primary Examiner*—Mitchell J. Hill
*Assistant Examiner*—Kevin Hurley
*Attorney, Agent, or Firm*—Arne I. Fors; Jeffrey T. Imai

[57] ABSTRACT

A towing device for front wheel drive vehicles in which support plates are attached to the two front axle hubs, the support plates are each connected to a strut of said vehicle whereby the respective axle of said vehicle is prevented from rotating, an ancillary axle depending from each said support plate has an axle hub adapted to receive a wheel for supporting said vehicle, and draw bars secured at one end to the support plates and converging at the other end to receive a coupler permit attachment to a towing vehicle.

8 Claims, 3 Drawing Sheets

VEHICLE TOWING APPARATUS

FIELD OF THE INVENTION

This invention relates to a vehicle towing device and, more particularly, relates to an apparatus by which the front wheel axles of a front wheel drive vehicle are immobilized from rotation and a new free wheeling axle is substituted for each drive wheel axle.

BACKGROUND OF THE INVENTION

Vehicle towing devices are commonly used for towing disabled vehicles and for towing dinghy vehicles such as cars and small trucks behind recreational vehicles such that a dinghy vehicle is available to the owner when their destination is reached. In that front wheel drive vehicles have the speedometer and odometer operatively connected to the transmission, and in that it is unlawful to disconnect the odometer from the transmission, the miles logged while the vehicle is towed are shown on the odometer. Although the miles accumulated do not involve any load and wear on the power train, since the engine, transmission and other driveline components are not under load, warranty coverage may be denied due to the accumulated total mileage.

Various types of vehicle towing trailers are known. U.S. Pat. No. 3,559,827 which issued Feb. 2, 1971 to Schier shows a device having a tow bar frame assembly and castor wheels spaced outside the front wheels of the vehicle towed. An electric motor powers a hoist for raising and lowering the vehicle to be towed onto the trailer.

U.S. Pat. No. 2,541,582 which issued Feb. 13, 1951 to Hawkins shows another embodiment of a tow trailer having ground-engaging wheels located outside the front wheels of the vehicle being towed. Wheel-supporting cradles on the trailer receive and slightly elevate the wheels of the towed vehicle above the roadway. The supporting cradles are spaced to correspond to the spacing of the front wheels of the vehicle being towed.

Both of these patents relate to trailers which are fairly large and cumbersome and which are not easily stored.

SUMMARY OF THE INVENTION

The disadvantages of the prior art may be overcome by providing a relatively simple vehicle towing device which is relatively easy to install for use and which can be collapsed for storage.

In its broad aspect, the towing device of the invention for front wheel drive vehicles having a pair of front wheels removed from said vehicles on front axle hubs comprises a pair of support plates, means formed on the support plates for attachment of the support plates to the two front axle hubs; means formed on the support plates for connection of each said support plate to a strut of said vehicle whereby the respective axle of said vehicle is prevented from rotating; an ancillary axle depending outwardly substantially perpendicular from each said support plate from a position below said means formed on the support plate for attachment to said front axle hub; said ancillary axle having a hub, said ancillary axle hub being adapted to receive a wheel for supporting said vehicle; and draw bars secured at one end to the support plates and converging at the other end to receive a coupler for attachment to a towing vehicle.

According to one aspect of the invention, a towing device for front wheel drive vehicles having a pair of front wheels mounted on front axle hubs comprises a pair of support plates fixedly connected to the front axle hubs of a vehicle; means for connecting said support plates to a towing vehicle; at least one bracket on each support plate for attaching the support plates to suspension struts of the vehicle; ancillary axles extending substantially horizontally outwardly from said support plates from below said support plates' connections to said front axle hubs; said ancillary axles having hubs journalled therein for receiving vehicle wheels for supporting the vehicle.

BRIEF DESCRIPTION OF THE DRAWINGS

The present invention will now be described in detail with reference to the accompanying drawings, in which.

BRIEF DESCRIPTION OF THE PREFERRED EMBODIMENT

Figure 1:
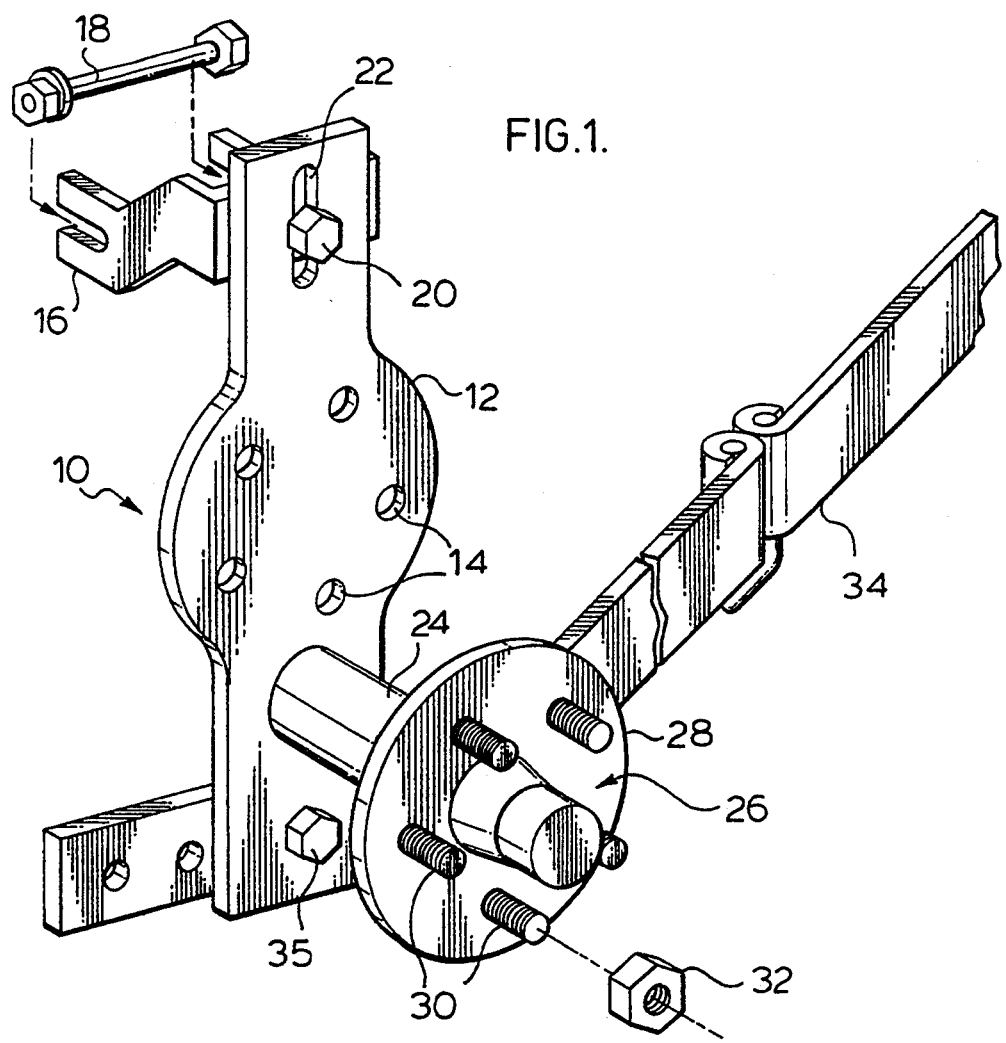
FIG. 1 is a perspective view of the device of the invention showing a towing bar partly cut away forming part thereof.

Referring first to FIG. 1, the towing device depicted by numeral 10 comprises support plate 12 which has apertures 14 for attaching towing device 10 to a front axle hub 15 (FIG. 6) of a vehicle. Bracket 16 extending inwardly from support plate 12 fits onto the MACPHERSON strut 46, or like suspension strut (FIG. 5), of the vehicle. Bracket 16 may be attached to the MACPHERSON strut by clamping onto the strut itself with the use of bolt 18. Bracket 16 may also be attached to a retrofit top bolt (not shown) joined to the MACPHERSON strut 46. Bolt and nut combination 20 joins bracket 16 to support plate 12. Bracket 16 may be attached at various positions to the MACPHERSON strut by vertically adjusting its position by sliding the bolt 20 and nut attachment up or down through elongated vertical slot 22.

Ancillary axle 24 extends outwardly substantially perpendicular to support plate 12 below the attachment of support plate 12 to the axle hub of the vehicle. Hub 26 is journalled for rotation at the end of ancillary axle 24.

Figure 6:
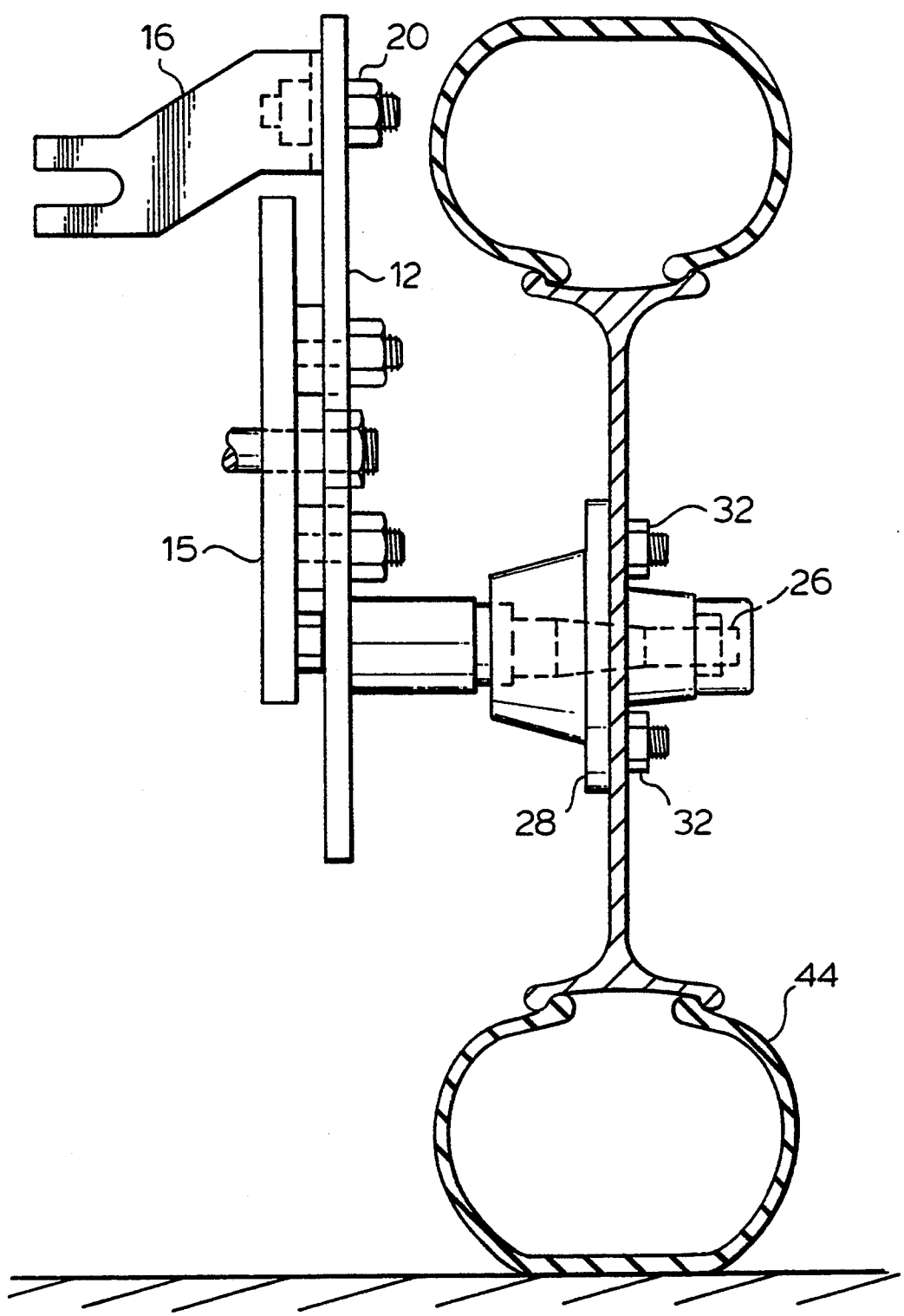
FIG. 6 is an end elevation view of the support plate of the towing device showing a section of a wheel attached to the ancillary axle hub.

Ancillary axle hub 26 includes backing plate 28. Bolts 30 project from backing plate 28 for engagement with the hub of a vehicle wheel 44 (FIG. 6). In the preferred embodiment, the number of bolts 30 in backing plate 28 corresponds to the number of apertures 14, enabling the vehicle wheel to be removed from the vehicle and placed on ancillary axle hub 26. Nuts 32 may be used to secure the vehicle wheel to ancillary axle hub 26. Vehicles may employ 4, 5 or 6 bolts for securing the wheel to the hub. The towing device includes variations of support plates 12 and ancillary axle hub 26 to complement the varieties of bolts used to attach the wheels to hubs. Support plate 12 and ancillary axle hub 26 may be adapted to engage a variety of wheel sizes such as 13", 14" and 15" diameter wheels.

Figure 2:
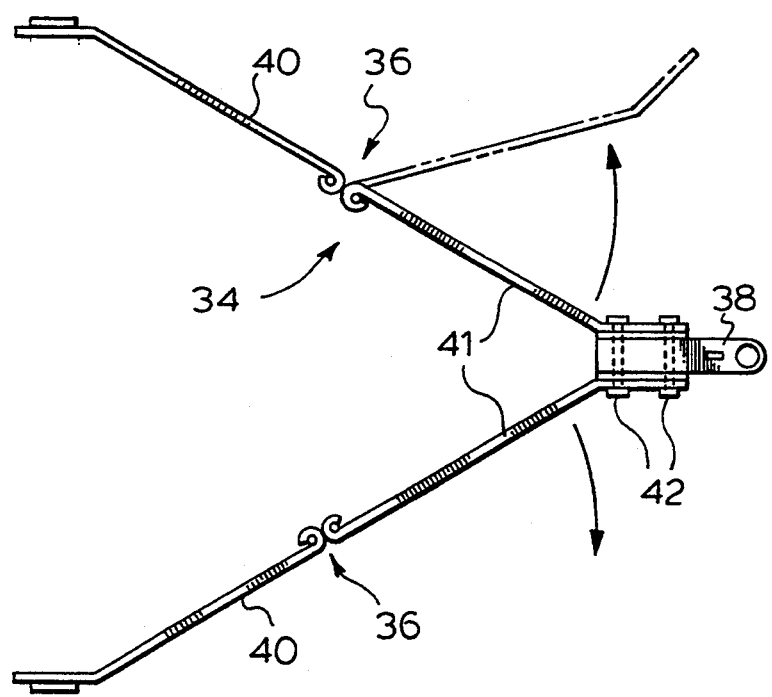
FIG. 2 is a top plan view of the device including a towing bar assembly showing its connection to a hitch or coupler.

The towing bar assembly 34 has arms 40 adjustably connected to support plate 12 by bolt 35 and a corresponding nut (not shown). Referring now to FIG. 2, towing bar assembly 34 is comprised of two elongated arms 40 which are connected to support plates 12 as shown in FIG. 1 on each side of the vehicle. Each arm 40 contains central hinge 36 enabling fast and easy assembly and articulation of the arm for storage, as depicted by ghost lines in FIG. 2. Towing bar assembly 34 also comprises hitch or coupler 38 for attachment to the draw bar of the towing vehicle. The front converging ends 41 of arms 40 are attached to hitch 38 by bolt and corresponding nut assemblies 42.

Figure 3:
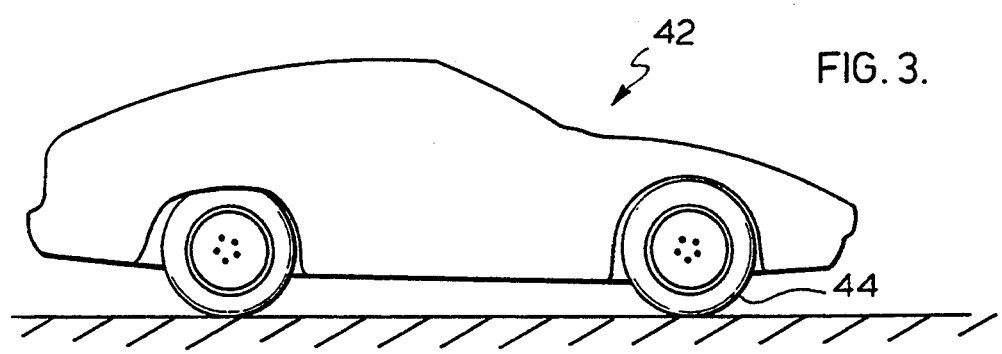
FIG. 3 is a side elevation view of an automobile at rest.
Figure 4:
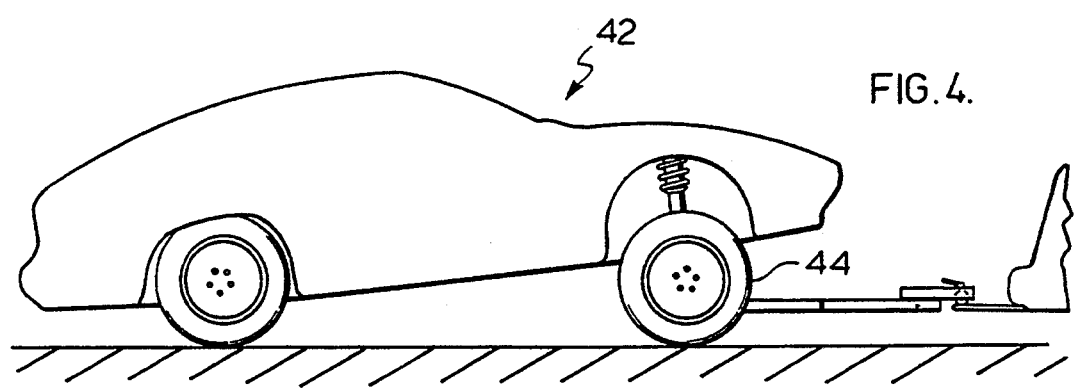
FIG. 4 is a side elevation view of the automobile thereof with the towing device in operation and the towing bar assembly attached to a vehicle draw bar hitch.

FIGS. 3 and 4 show the operation of the towing device of the invention. FIG. 3 shows vehicle 42 with front wheel 44. Vehicle 42 may, for example, be a front wheel drive automatic transmission vehicle. FIG. 4 shows vehicle wheel 44 attached to the towing device of the invention which causes the front end of vehicle 42 to be raised to the attitude shown.

Figure 5:
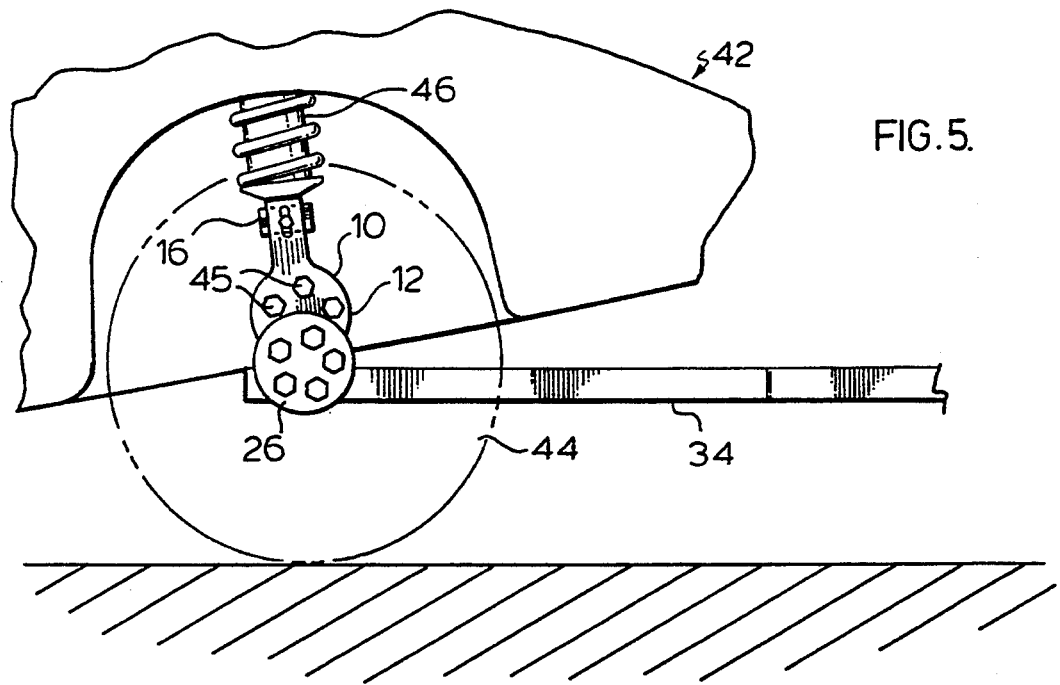
FIG. 5 is an enlarged fragmentary side view of the front end of the automobile of FIG. 4 showing the towing device secured to the suspension strut of the vehicle.

Referring now to FIG. 5, with wheel 44 shown by ghost lines for clarity of illustration, towing device 10 is attached to vehicle 42 by securement of support plate 12 to the front wheel axle by nuts 32 on lugs 45. Bracket 16 attaches the towing device 10 to MACPHERSON strut 46 of the vehicle. This clamping of bracket 16 to MACPHERSON strut 46 in combination with the attachment of support plate 12 to the front axle hub 15 (FIG. 6) of the vehicle prevents the vehicle's axle from rotating. By attaching the vehicle wheels 44 to ancillary axle hubs 26, as shown in FIGS. 5 and 6, the vehicle is supported by and travels on its original wheels without rotation of the vehicle front wheel axles. Thus, the miles towed are not accumulated on the odometer.

It will be understood that ancillary axle hub 26 may have a different number and arrangement of bolts 30 than apertures 14 in hub 15. In this latter embodiment, a wheel other than the vehicle wheel would be utilized.

The present invention provides a number of advantages. A motor vehicle can be towed behind another motor vehicle such as a recreational vehicle and the towing device readily collapsed for storage in a vehicle trunk at the destination. The towed vehicle's front axles are mobilized during towing, thereby obviating wear on the towed vehicle's powertrain and avoiding accumulation of mileage on the odometer.

It will also be understood that modifications can be made in the embodiment of the invention described herein without departing from the scope and purview of the invention as defined by the appended claims.

I claim:
1. A towing device for a front wheel drive vehicle having a pair of front wheels removed from said vehicle's front axle hubs comprising:
a pair of support plates, means formed on the support plates for attachment of the support plates to the two front axle hubs; means formed on the support plates for connection of each said support plate to a strut of said vehicle whereby the respective axle of said vehicle is prevented from rotating; an ancillary axle depending outwardly substantially perpendicular from each said support plate from a position below said means formed on the support plate for attachment to said front axle hub; said ancillary axle having a hub, said ancillary axle hub being adapted to receive a wheel for supporting said vehicle; and draw bars having opposite ends secured at one end to the support plates and converging at the opposite end to receive a coupler for attachment to a towing vehicle.

2. A towing device as claimed in claim 1 wherein each of said draw bars comprises a pair of elongated arms having opposite ends wherein each of said elongated arms is hinged intermediate its ends for articulation whereby the arm can be folded.

3. A towing device as claimed in claim 1 wherein said means formed on the support plates for attachment of the support plates to the two front axle hubs is a plurality of spaced-apart apertures formed in the support plates adapted to engage a plurality of corresponding spaced-apart bolts on said front axle hub or which receive lugs for securement to the front axle hub.

4. A towing device as claimed in claim 1 wherein said means formed on the support plates for connection of each said support plate to a strut of said vehicle comprises a bracket.

5. A towing device as claimed in claim 4 wherein said bracket is attached to said suspension strut by engaging a bolt and corresponding nut.

6. A towing device as claimed in claim 1 wherein said ancillary axle hub has bolts projecting outwardly therefrom for engaging said wheel.

7. A towing device as claimed in claim 1 wherein the said strut is a MACPHERSON strut.

8. A towing device for a front wheel drive vehicle having a pair of front wheels removed from said vehicle's front axle hubs comprising: a pair of support plates, means for fixedly connecting said support plates to the front axle hubs of said vehicle; means for connecting said support plates to a towing vehicle; at least one bracket on each support plate for attaching the support plates to suspension struts of the vehicle to prevent rotation of the front axle hubs; and ancillary axles extending substantially horizontally outwardly from said support plates from below said means for fixedly connecting said support plates to said front axle hubs; said ancillary axles having hubs journalled therein for receiving vehicle wheels for supporting the vehicle.

* * * * *